United States Patent [19]
Koike et al.

[11] Patent Number: 5,177,733
[45] Date of Patent: Jan. 5, 1993

[54] SOUND RECORDING PLAYING APPARATUS WITH IMPROVED VIBRATION PLATE

[75] Inventors: Eishi Koike, Sagamihara; Masumi Kaneko, Yokohama; Yasushi Ohtani, Kanagawa, all of Japan

[73] Assignee: Ozen Corporation, Tokyo, Japan

[21] Appl. No.: 688,033

[22] Filed: Apr. 19, 1991

[51] Int. Cl.⁵ .................... G11B 19/14; G11B 25/04
[52] U.S. Cl. ................................ 369/258; 369/63; 369/65; 369/263; 369/75.1
[58] Field of Search ............ 369/63, 64, 65, 67, 369/31, 256, 173, 75.1, 68, 263, 258

[56] References Cited

U.S. PATENT DOCUMENTS

| | | | |
|---|---|---|---|
| 3,740,056 | 6/1973 | Nuttall et al. | 369/263 X |
| 4,061,343 | 12/1977 | Watanabe | 369/63 |
| 4,078,807 | 3/1978 | Sherwood | 369/263 |
| 4,150,831 | 4/1979 | Watanabe | 369/67 |
| 4,254,184 | 3/1981 | Tsukagoshi et al. | 369/173 |
| 4,259,550 | 3/1981 | Nakamatsu | 369/256 |
| 4,347,595 | 8/1982 | Ngai | 369/67 |
| 4,447,898 | 5/1984 | Koike | 369/65 |
| 4,731,777 | 3/1988 | Yashitoshi et al. | 369/263 |
| 4,922,478 | 5/1990 | Verhagen | 369/263 X |

FOREIGN PATENT DOCUMENTS 1-290162 of 1989 Japan.

*Primary Examiner*—Stuart S. Levy
*Assistant Examiner*—Joseph A. Rhoa
*Attorney, Agent, or Firm*—Weintraub, DuRoss & Brady

[57] ABSTRACT

A casing of a sound record playing apparatus includes an upper body (1B) and a lower body (1A), and a vibration plate (16) is formed by reducing a thickness of a part of the upper body. An inner surface of the vibration plate is in abutment with a pickup (13) to amplify the vibrations of the pickup. Thus, a conical speaker which has been used conventionary can be eliminated, and the thickness of the recording disk reproducing apparatus is reduced.

2 Claims, 3 Drawing Sheets

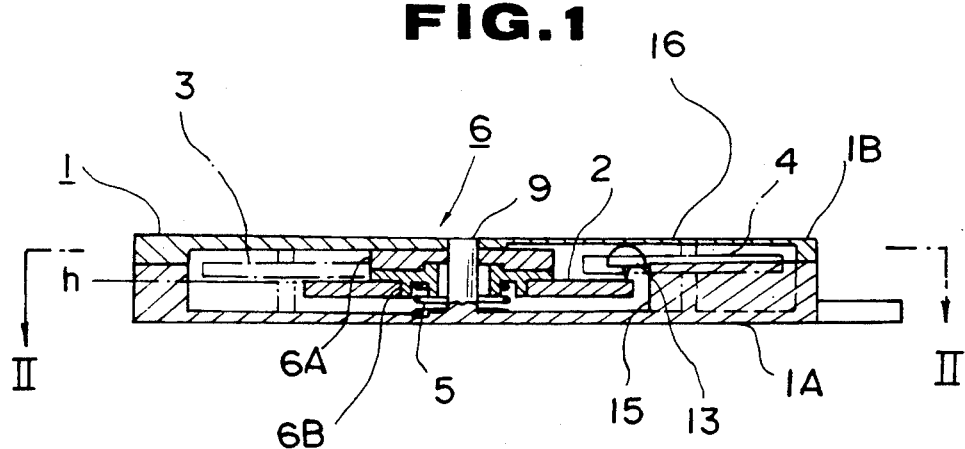
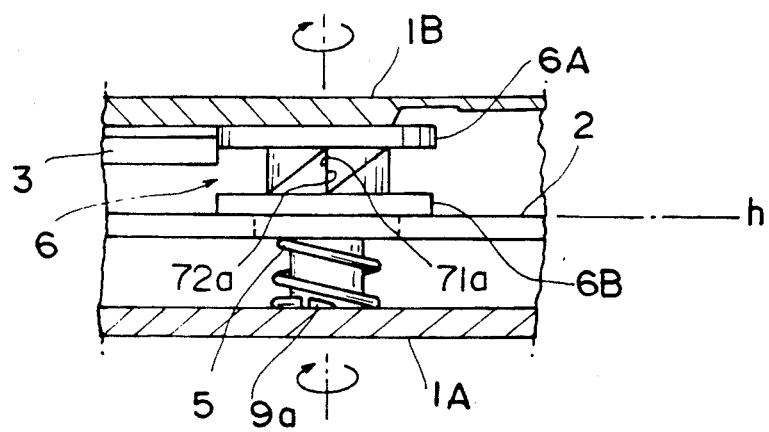
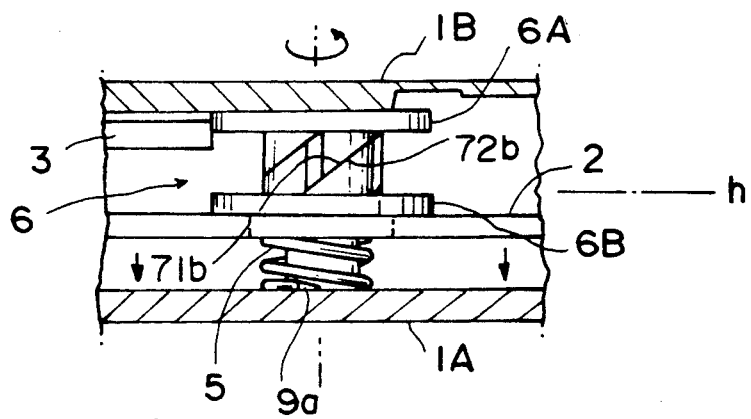

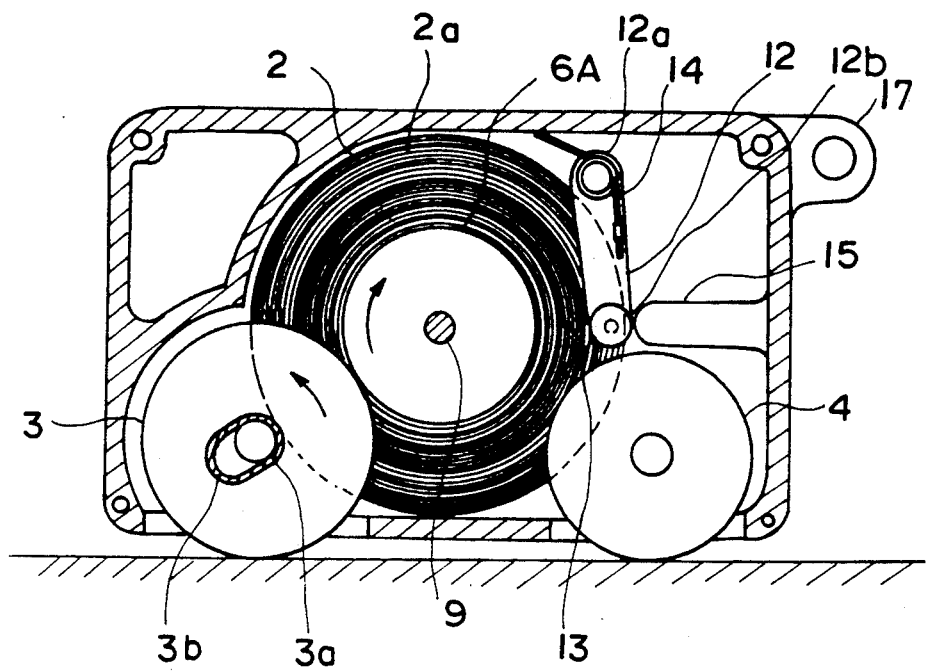
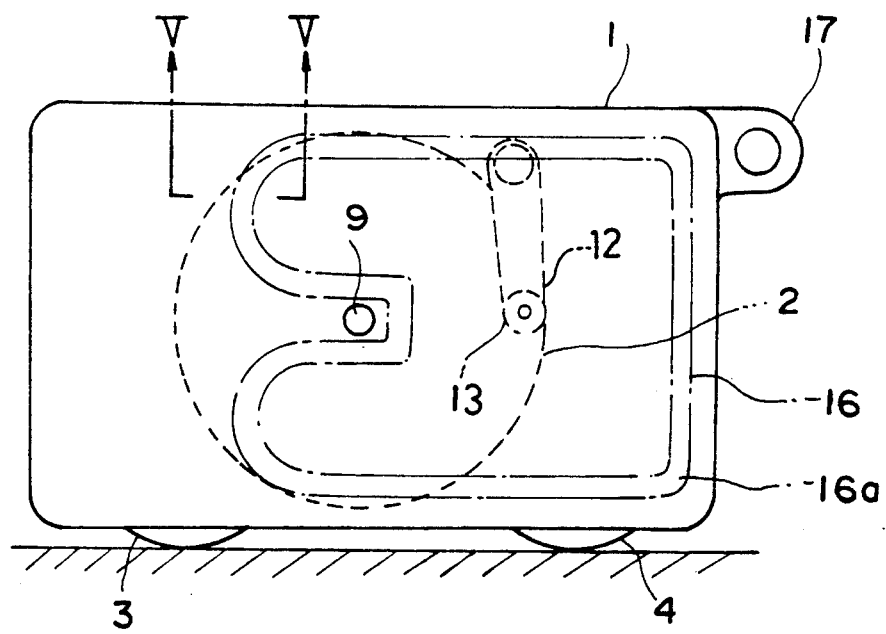

SOUND RECORDING PLAYING APPARATUS WITH IMPROVED VIBRATION PLATE

BACKGROUND OF THE INVENTION

1. Field of the Invention

The present invention relates to a sound record playing apparatus having a reduced size by improving a vibration plate or a stylus force mechanism.

2. Description of the Prior Art

A prior art recording disk reproducing apparatus is disclosed, for example, in Japanese Patent Laid-Open Publication No. 1-290162.

In this apparatus, a recording disk integral with a turn table, and a frictional driving wheel, which serves as the driving mechanism of the recording disk, are disposed within a casing parallel to each other. A pickup for scanning a modulated groove is disposed above the recording disk so that the pickup abuts against a conical speaker cone fixed to the casing. A peripheral side surface of the turn table is tapered to have a reduced diameter at a lower circumferential edge, and the frictional driving wheel is made to advance towards and retreat away from the turn table. When a peripheral edge of the frictional driving wheel abuts against the tapered surface of the turn table, the turn table and the recording disk are raised or lowered so that a stylus force of the pickup is applied or released. The turn table and the frictional driving wheel constitute a stylus force mechanism.

Accordingly, in this apparatus, by rotating the frictional driving wheel while pressing against a floor or ground, the frictional driving wheel moves the turn table towards the pickup. By rotating the recording disk where the stylus force is applied to the pickup, the pickup scans the modulated groove to reproduce the recording disk.

However, recently, as the taste of customers is directed to products which are light in weight and small in size, the demand for compact sound record players has increased. In particular, a card-type record playing apparatus having a reduce thickness is desired.

The prior art apparatus, by nature of the conical speaker cone disposed within the casing as a separate component, must have a predetermined space provided between the casing and the recording disk. Therefore, the thickness of the apparatus is inevitably increased. Furthermore, the required structure of the stylus force mechanism demands the thickness of the peripheral side surface of the turn table to be large enough to form the tapered surface. As a result, limitations have prevented reductions in the thickness of the structure.

SUMMARY OF THE INVENTION

The invention was made in view of the problems mentioned above, and it is an object of the invention to provide sound record playing apparatus having a small thickness or compactness by improving a vibration plate of a speaker and a stylus force mechanism.

A sound record playing apparatus in the present invention includes a sound record within a casing, a driving mechanism for driving the sound record, and a pickup for scanning a modulated groove disposed within an upper surface of the sound record. A vibration plate is integrally formed in a part of an upper wall of the casing, the vibration plate having a reduced thickness relative to the rest of the casing the pickup is made to abut against the vibration plate thereby to achieve the sound record playing apparatus of a thin-thickness or compact type.

Furthermore, a stylus force mechanism for applying a stylus force to the pickup and releasing the stylus force is constituted by an elastic member for urging the recording disk towards the casing from below, and an expansion mechanism disposed between the sound record and the casing. The expansion mechanism includes a lower member fixed to the sound record, and an upper member which abuts against the casing and which is operatively connected to the driving mechanism. In each of opposing end faces of the respective lower member and the upper member, at least one operating claw is formed such that the at least one operating claw has an engaging side which rises vertically and a slant side which has a gradual inclination. Thus, the operating claw has a sawtooth shape. The lower member and the upper member are disposed superposing one on the other so that the engaging sides and the slant sides of the respective lower member and the upper members are abutable or engagable with each other.

In the present invention, a part of a wall of the casing is made into a thin plate shape, thereby to form a vibration plate, and this vibration plate amplifies vibrations of the pickup which scans the sound record to generate sound. Thus, since a part of the casing performs the role of the speaker cone. Thus, there is no need to provide the speaker cone within the casing. As a result, the thickness of the apparatus reduces and the apparatus becomes compact.

Furthermore, the stylus force mechanism is constituted by an elastic member and an expansion mechanism, and when a upper member of the expansion mechanism is rotated in a predetermined direction by a driving mechanism, an operating claw of the upper member is engaged with an operating claw of a lower member of the expansion mechanism with their engaging sides abutting against each other. Thus, the rotation of the casing side member is transmitted to the lower member to rotate the sound record and sound reproduction is accomplished.

On the other hand, when the upper member is rotated in an opposite direction, slant sides of both of the at least one operating claw abut against each other, and one of the at least one operating claw rides over the other of the at least one operating claw so that an interval between both the members is increased and the expansion mechanism is expanded. As a result, the sound record is lowered downwardly against the urging force of an elastic member, and the stylus force of the pickup released.

Accordingly, since the stylus force mechanism is constituted by the elastic member and the operating claws, the structure is simple and the thickness of the apparatus is reduced.

The present invention will be better understood by reference to the drawings wherein like numbers refer to like parts in the various figures.

BRIEF DESCRIPTION OF THE DRAWINGS

FIG. 1 is a side sectional view of a compact sound record playing apparatus of an embodiment of the present invention;

FIG. 2 is a plan sectional view taken along the line of II—II in FIG. 1;

FIG. 3 is a plan view of the compact sound record playing apparatus of FIG. 1;

FIGS. 6A and 6B are sectional views for explaining the operation of the stylus force mechanism.

DESCRIPTION OF THE PREFERRED EMBODIMENT

Figure 4:
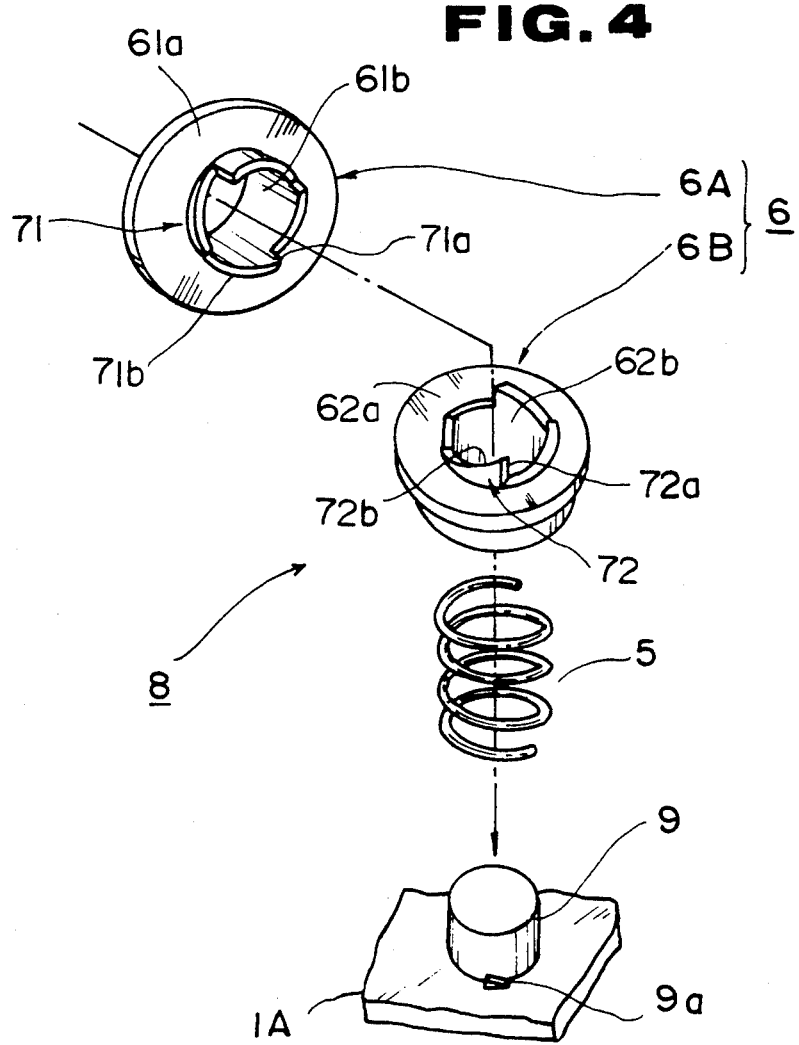
FIG. 4 is an exploded perspective view of the expansion mechanism in FIG. 1.

The structure of an embodiment of the present invention will be described with reference to FIGS. 1-5.

A casing 1 of a sound record playing or thin-thickness type recording disk reproducing apparatus is composed of a lower part 1A and an upper part 1B. The casing 1 is of a flat box shape having a small thickness or height and having wide upper and bottom, and generally rectangular, surfaces. Within the casing 1, a sound record or recording disk 2, a frictional driving wheel 3, constituting a driving mechanism, and an auxiliary wheel 4 are supported rotatably between the lower part 1A and the upper part 1B so that they are parallel with one another. A stylus force or spring 5 constituting an elastic member, such as a spring, is disposed between the sound record 2 and the lower part 1A of the casing 1 to urge the sound record 2 upwardly. The stylus force forms a means for moving the sound record into engagement. An expansion mechanism 6 is disposed between the sound record 2 and the upper part 1B of the casing 1.

FIG. 4 shows a disassembled perspective view of the expansion mechanism 6. The expansion mechanism 6 includes a casing side or upper member 6A in abutment with an inner surface of the upper part 1B, and a recording disk side or lower member 6B fixed to the sound record 2. Both the upper member 6A and the lower member 6B respectively have disk-like main bodies 61a and 62a, and center holes 61b and 62b formed in the center of the disk-like main bodies 61a and 62a. A rotary shaft or shaft 9 formed on the lower part 1A of the casing 1 is fitted into the center holes 61b and 62b of both the upper and lower members 6A and 6B after the stylus force 5 is secured to a lower surface of the lower member 6B. Thus, both the upper and lower members 6A and 6B are supported rotatably and concentrically. The stylus force 5 and the expansion mechanism 6 constitute a stylus force mechanism 8. Furthermore, as shown in FIG. 1, in an assembled condition of these parts, the stylus force 5 urges the expansion mechanism 6 towards the upper part 1B of the casing 1, and pushes up the sound record 2 to a height h (hereinafter, referred to as a reproducing height h) so as to make the sound record 2 abut against a pickup 13. Furthermore, the shaft 9 has a projection formed at a predetermined position on a peripheral surface, and this projection serves as a stopper 9a when the stylus force 5 rotates in an opposite direction.

Both the upper and lower members 6A and 6B are respectively formed with a plurality of, in this embodiment, four operating claws 71 and 72 along circumferential edges of the center holes 61b and 62b. Each of the operating claws 71 and 72 has an engaging side 71a or 72a which rises in parallel with the rotary shaft 9 and a slant side 71b or 72b which has a gradual inclination, so that the operating claws 71 72 has a sawtooth shape. When both the upper and lower members 6A and 6B are superposed on each other, the operating claws 71 and 72 are engaged with each other, and the engaging sides 71a and 72a abut against each other. Also, the slant sides 71b and 72b abut against each other. In this case, a direction in which a force is exerted between the engaging sides 71a and 72a is referred to as a forward direction, and a direction in which a force is exerted between the slant sides 71b and 72b is referred to as a backward direction.

FIG. 2 shows a plan sectional view of the compact record playing apparatus and a support hole 3b formed in the casing 1 to support a driving shaft 3a of the frictional driving wheel 3. The supporting hole 3b is a long or elliptical hole so as to enable the frictional driving wheel 3 to advance towards the rotary shaft 9 and to retreat away from the rotary shaft 9. When the frictional driving wheel 3 is rotated after it is moved towards the rotary shaft 9, a peripheral side surface of the frictional driving wheel 3 is brought into abutment with a peripheral side surface of the upper member 6A, and the rotation is transmitted to the upper member 6A.

Furthermore, as shown in FIG. 2, a tone arm 12 is located on an upper side of the recording disk 2, and a base portion 12a of the tone arm 12 is rotatably supported by the lower part 1A of the casing 1. The pickup 13 fixed to an end 12b of the tone arm 12 is rotated about the base portion 12a. The tone arm 12 is also provided with a return spring 14 to urge the tone arm 12 in a circumferential edge direction of the sound record 2. A stopper 15 of the tone arm 12 is formed on the main body 1A of the casing 1, and the stopper 15 performs the positioning of the pickup 13 so that the pickup 13 is stopped at a reproduction waiting position at which the pickup 13 engages a start end of a modulated groove 2a when the tone arm 12 is returned by the return spring 14.

FIG. 3 is a plan view of the recording disk reproducing apparatus, and shown in FIGS. 1 and 3, the upper part 1B of the casing 1 is formed with a vibration plate 16 by reducing a wall thickness of the upper part 1B of the casing 1, with the wall thickness unreduced at peripheral portion of the rotary shaft 9. An upper end of the pickup 13 abuts against an inner surface of the vibration plate 16.

Figure 5:
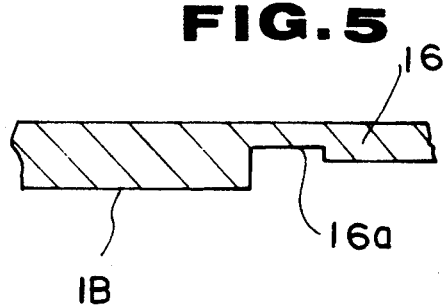
FIG. 5 is a partial sectional view taken along the line V—V in FIG. 3.

As shown in FIGS. 3 and 5, the thickness of a peripheral edge portion of the vibration plate 16 is further reduced in the inner surface of the upper part 1B, and a thin plate band 16a is formed so that the vibration plate 16 is easily vibrated. The outer surface of the upper part 1B forms a flat plane.

Furthermore, as shown in FIGS. 2 and 3, an ear 17 is formed at a upper right portion of the front of the casing 1, so as to facilitate bringing the apparatus with a hand string tied to the ear 17.

The operation of the apparatus will be described with reference to FIGS. 2 through 6A and 6B.

Under a condition in which the tone arm 12 is positioned at the reproduction waiting position, the frictional driving wheel 3 and the auxiliary wheel 4 are pressed against a wall, a floor, or ground by the user, and the apparatus is moved to the side of the frictional driving wheel 3 (to a left hand direction in FIG. 2) to rotate the frictional driving wheel 3. Then, the peripheral side surface of the frictional driving wheel 3 is brought into abutment with the peripheral side surface of the casing side member 6A of the expansion mechanism 6, and the rotation of the frictional driving wheel 3 is transmitted to the upper member 6A. Thus, the upper member 6A begins rotation in the forward direction.

At this time, as shown in FIG. 6A, the operating claws 71 and 72 of the upper member 6A and the lower member 6B are engaged with each other, and the engaging side 71a of the upper member 6A presses the engaging side 72a of the lower member 6B in a circumferential direction about the rotary shaft 9 thereby to transmit the rotation of the upper member 6A to the lower member 6B. As a result, the sound record 2 is rotated. At this time, since the sound record 2 is at the reproducing height h due to the urging force of the stylus force or spring 5, the pickup 13 scans the modulated groove 2a with the rotation of the sound record 2, and produced vibrations vibrate the vibration plate 16 to reproduce the sound record 2.

When the pickup 13 reaches an end of the modulated groove 2a to complete the reproduction of the sound record 2, then, as shown in FIG. 6B, the apparatus is moved by the user towards the auxiliary wheel 4 to rotate the upper member 6A in the opposite direction. At this time, the slant side 71b of the operating claw 71 of the upper member 6A ridges over the slant side 72b of the operating claws 72 of the lower member 6B. As a result, the interval between the upper member 6A and the lower member 6B is increased, and the lower member 6B is lowered against the urging force of the stylus force or spring 5, thereby to press the sound record 2 downwardly and lower than the reproducing height h. Under this condition, the force on the pickup 13 is released and the engagement with the sound record 2 is also released, and the tone arm 12 is returned to the reproduction waiting position urged by the return spring 14. At this time, since an end portion of the stylus force spring 5 is held by the stopper 9a, the lower member 6B is never turned together with the stylus force spring 5 and the reproduction of the sound record 2 in a reverse direction is prevented.

In this manner, by repeating the above-mentioned operation, the sound record 2 can be played continuously.

As described in the foregoing, in the recording disk reproducing apparatus in the present invention, since a part of the casing constitutes the vibration plate 16, the speaker cone is not necessary, and thus, the apparatus can be made compact or thin. Furthermore, since the stylus force mechanism is constituted by the stylus force spring 5 and the expansion mechanism 6, the structure becomes simple, and thus, it is possible to make the apparatus compact or thin.

In particular, in the apparatus in the embodiment, since the thickness of the peripheral portion of the vibration plate 16 is further reduced to form the thin plate band 16a, the reproduced sound can be made loud.

Furthermore, in the apparatus in the embodiment, since the stopper 9a prohibits the rotation of the stylus force spring 5 in the reverse direction, the lower member 6B never rotates in the reverse direction. As a result, the reliable operation of the expansion mechanism 6 is insured.

In the embodiment, while the auxiliary wheel 4 is provided other than the frictional driving wheel 3, it is of course possible to dispense with the auxiliary wheel 4.

Furthermore, in the embodiment, while the driving mechanism is constituted by the manual type frictional driving wheel 3, if the driving mechanism is constituted by a sheet type stepping motor, the apparatus can be made as an electric drive type apparatus without increasing the thickness.

In the present invention, the following advantages are provided.

the vibration plate is formed integrally with the casing. Thus, a speaker cone is so replaced, and a compact record playing apparatus can be achieved.

Since the stylus force mechanism is constituted by an elastic member and an expansion mechanism, the peripheral side surface of the recording disk or the turn table is not required to have a large thickness, it is possible to achieve a compact record playing apparatus.

What is claimed is:

1. A sound record playing apparatus for playing a disk record and having a reduced height, comprising:
   a casing defined by a parallel upper part (1B) and lower part (1A), wherein the lower part has a continuous first thickness and the upper part includes a first portion adjacent a disk pickup (13) and a second portion having said first thickness distant from said pickup; and wherein said first portion defines a vibration plate which abuts a top portion of said pickup when said disk record is being played, and has a second thickness substantially less than said first thickness;
   said disk record having an upper surface, the disk record having a modulated groove formed on the upper surface of the disk record, the disk record deployed in a cavity of the casing;
   said disk pickup for scanning the modulated groove of the disk record, the pickup being deployed within the cavity of the casing; and
   wherein the pickup is mounted on a tone arm coupled to said casing.

2. The apparatus of claim 1, further comprising a driving wheel (3) for being pressed against a surface and thereby driving said disk record.

* * * * *